(12) United States Patent
Choi

(10) Patent No.: US 8,514,782 B2
(45) Date of Patent: Aug. 20, 2013

(54) LOCATION INFORMATION SERVICE METHOD

(75) Inventor: Jae-Hyuk Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 12/934,238

(22) PCT Filed: Mar. 31, 2009

(86) PCT No.: PCT/KR2009/001646
§ 371 (c)(1),
(2), (4) Date: Sep. 23, 2010

(87) PCT Pub. No.: WO2009/145452
PCT Pub. Date: Dec. 3, 2009

(65) Prior Publication Data
US 2011/0022710 A1  Jan. 27, 2011

Related U.S. Application Data

(60) Provisional application No. 61/042,553, filed on Apr. 4, 2008, provisional application No. 61/045,606, filed on Apr. 16, 2008.

(30) Foreign Application Priority Data

Apr. 30, 2008  (KR) .................. 10-2008-0040497

(51) Int. Cl.
*G06F 15/173* (2006.01)

(52) U.S. Cl.
USPC ........ 370/328; 370/252; 370/310; 455/456.1; 455/457

(58) Field of Classification Search
USPC ............................. 370/328, 252; 455/456.1
See application file for complete search history.

(56) References Cited

U.S. PATENT DOCUMENTS

| | | | |
|---|---|---|---|
| 7,254,388 B2 * | 8/2007 | Nam et al. ................ | 455/418 |
| 2006/0223490 A1 | 10/2006 | Kim et al. | |
| 2007/0238458 A1 * | 10/2007 | Shim ....................... | 455/433 |
| 2007/0281670 A1 | 12/2007 | Shim | |
| 2009/0204821 A1 * | 8/2009 | Fransson et al. ........... | 713/187 |

FOREIGN PATENT DOCUMENTS

| | | |
|---|---|---|
| KR | 10-2006-0005674 A | 1/2006 |
| KR | 10-2006-0106769 A | 10/2006 |
| KR | 10-2007-0105835 A | 10/2007 |
| KR | 10-2008-0014602 A | 2/2008 |

\* cited by examiner

*Primary Examiner* — Huy D Vu
*Assistant Examiner* — Teisha D Hall
(74) *Attorney, Agent, or Firm* — Birch, Stewart, Kolasch & Birch, LLP

(57) ABSTRACT

A location service method in a terminal includes: receiving a message including a first parameter with respect to an inner area determined based on a particular geographic area and a second parameter with respect to an outer area from a server; and checking whether or not the terminal leaves the particular geographic area through the parameters of the inner area and the outer area.

4 Claims, 8 Drawing Sheets

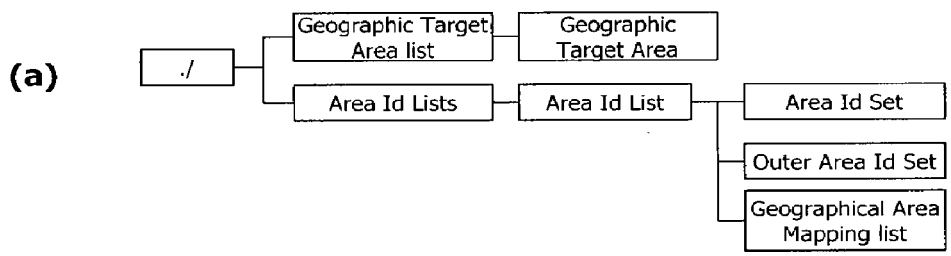

(b)

| Geographic Target Area list | Define a list of geographic target areas, This parameter is OPTIONAL. |
|---|---|
| > Geographic Target Area | Defines a geographic target area in terms of either:<br>- Circular Area<br>- Elliptical Area<br>- Polygon |
| Area Id Lists | This parameter contains one or more Area Id lists. This parameter is REQUIRED when the Geographic Target Area List is NOT present and is OPTIONAL when the Geographic Target Areas are present. The maximum number of Area Id lists to be included is determined by the element "Max Area Id List" in SET capabilities. |
| >Area Id list | Each Area Id list consists of a set of Areas Ids plus a Geographic Area Mapping List. |
| >>Area Id Set | A list of area ids. The area ids listed can be any combination of GSM Area Ids, WCDMA Area Ids, CDMA Area Ids, HRPD-Area Ids, UMB-Area Ids, LTE-Area Ids, WLAN Area Ids or WiMAX Area Ids. Each set can contain from 1 to [MaxAreaId] area ids. |
| >> Outer Area Id Set | A list of outer area ids. In case of leaving trigger type, this parameter may be present. If this parameter is present, the SET SHALL interpret the Area Id Set parameter as the Inner Area ID Set. This parameter SHALL NOT include the area-ids included in the Area Id Set parameter.<br>The area ids listed can be any combination of GSM Area Ids, WCDMA Area Ids, CDMA Area Ids, HRPD-Area Ids, UMB-Area Ids, LTE-Area Ids, WLAN Area Ids or WiMAX Area Ids. Each set can contain from 1 to [MaxAreaId] area ids. |
| >> Geographic Area Mapping List | Represents a list of indexes to a Geographic Target Areas to which the Area Id list applies. (Example: 1,3,7,8).<br>The number of indexes can be from 1 to the number of Geographical Target Area elements<br>The value of each index can be from 1 to the number of Geographical Target Area elements. |

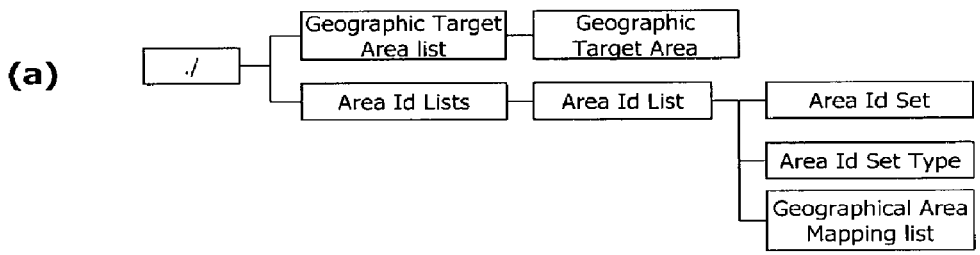

(b)

| Geographic Target Area list | Define a list of geographic target areas, This parameter is OPTIONAL. |
|---|---|
| > Geographic Target Area | Defines a geographic target area in terms of either:<br>-Circular Area<br>- Elliptical Area<br>- Polygon |
| Area Id Lists | This parameter contains one or more Area Id lists. This parameter is REQUIRED when the Geographic Target Area List is NOT present and is OPTIONAL when the Geographic Target Areas are present. The maximum number of Area Id lists to be included is determined by the element "Max Area Id List" in SET capabilities. |
| >Area Id list | Each Area Id list consists of a set of Areas Ids plus a Geographic Area Mapping List. |
| >>Area Id Set | A list of area ids. The area ids listed can be any combination of GSM Area Ids, WCDMA Area Ids, CDMA Area Ids, HRPD-Area Ids, UMB-Area Ids, LTE-Area Ids, WLAN Area Ids or WiMAX Area Ids. Each set can contain from 1 to [MaxAreaId] area ids. |
| >> Area Id Set Type | This parameter indicates the type of the Area Ids. This parameter can be of type :<br>•Inner Area Ids<br>•Outer Area Ids<br>In case of Entering or Inside event type, this parameter SHALL NOT be present. However in case of Leaving or Outside event type, this parameter SHALL be present. |
| >> Geographic Area Mapping List | Represents a list of indexes to a Geographic Target Areas to which the Area Id list applies. (Example: 1,3,7,8).<br>The number of indexes can be from 1 to the number of Geographical Target Area elements The value of each index can be from 1 to the number of Geographical Target Area elements. |

ID

LOCATION INFORMATION SERVICE METHOD

CROSS REFERENCE

This application is the National Phase of PCT/KR2009/001646 filed on Mar. 31, 2009, which claims priority under 35 U.S.C. 119(e) to U.S. Provisional Application Ser. Nos. 61/042,553 filed on Apr. 4, 2008 and 61/045,606 filed on Apr. 16, 2008 and under 35 U.S.C. 119(a) to Patent Application No. 10-2008-0040497 filed in the Republic of Korea on Apr. 30, 2008, all of which are hereby expressly incorporated by reference into the present application.

TECHNICAL FIELD

The present invention relates to a location information service and, more particularly, to a location service based on a secure user plane location (SUPL).

BACKGROUND ART

In general, a mobile communication system has a function part for calculating the position (or location) of a terminal in a mobile communication network to provide a location service that provides the location of the terminal to a certain entity in a periodic manner or according to a corresponding request.

A network structure related to the location service differs depending on an internal network structure, such as a 3GPP network, a 3GPP2 network, etc. Currently, there are several methods for calculating the location of the terminal, including a cell-ID method for transferring an ID of a cell to which a mobile terminal belongs, a method for calculating the location of a terminal through triangulation by measuring time taken for radio signals to reach each base station from the terminal, and a method of using a GPS (Global Positioning System).

In order to provide the location service to a user, a large quantity (amount) of signals and location information are to be transferred between the mobile terminal and a location server.

Recently, positioning technologies standardized for providing the location service (namely, location services provided based on the location of a mobile terminal) are increasingly used. These technologies can be provided generally through a user plane for transmitting user data and a control plane for transmitting control data, one of which is a Secure User Plane Location (SUPL) technique that provides the location service through the user plane.

A SUPL-based network includes a SUPL agent, a SUPL location platform (SLP), a SUPL enabled terminal (SET), and the like. The SUPL agent is a logical service access point that requests location information of a target SET from the SLP, receives measured location information of the target SET from the SLP, and uses it. The SLP is an entity that accesses network resources to obtain location information of the target SET according to a request from the SUPL agent, and performs roaming and resources management, and the like. The SET performs procedures defined at the SUPL along with the SLP through a user plane bearer.

There are two types of location services based on the SUPL: The first service refers to a periodic triggered service that provides the location of the target SET (i.e., terminal) according to a pre-set period; the second refers to an area event triggered service that provides the location of the target set (i.e., terminal) when pre-set conditions in relation to a particular area are met.

The area event triggered service will now be described in detail with reference to FIGS. 1 to 3.

FIG. 1 illustrates the concept of an area event triggered service according to the related art.

As shown in FIG. 1, there are four types of area event triggered services. In FIG. 1, the points at which location measurement is made are indicated as asterisks.

As shown in FIG. 1(a), a first area event triggered service is a location service for continuously monitoring whether the terminal 10 is located in a previously designated geographic area 50, which is also called an inside location service. A second area event triggered service as shown in FIG. 1(b) refers to a location service that monitors whether or not the terminal 10 enters the previously designated geographic area 50, which is also called an entering location service. A third area event triggered service as shown in FIG. 1(c) refers to a location service that continuously monitors whether the terminal 10 is located outside the previously designated geographic area 50, which is also called an outside location service. A fourth area event triggered service as shown in FIG. 1(d) refers to a location service that monitors whether or not the terminal 10 leaves the previously designated particular geographic area 50, which is also called a leaving location service.

FIG. 2 illustrates implementation of the area event triggered service as shown in FIG. 1.

As shown in FIG. 2(a), in order to implement the location service (inside service) as to where the terminal is located within the previously designated geographic area 50 or the location server (entering service) as to whether or not the terminal 10 enters the previously designated geographic area 50, an area-id parameter has been proposed. The area-id parameter is a list of IDs of cells. In case of the inside service and the entering service as shown in FIG. 2(a), the Area-id parameter includes a set of IDs of cells fully included in the previously designated geographic area 50. In case of the inside service, when the area-id parameter is provided, the terminal 10 compares a cell-id of a cell in which the terminal 10 is currently located with a cell-id in the Area-id parameter, and if the both cell-ids are consistent, the terminal 10 performs a position estimate (A-GPS) to monitor whether the terminal 10 is located in the previously designated geographic area 50. In addition, in case of the entering service, when the Area-id parameter is provided, the terminal 10 compares a cell-id of a cell in which the terminal 10 is currently located with a cell-id of the Area-id parameter, and if the both cell-ids are consistent, the terminal performs a position estimate to monitor whether the terminal 10 has entered the previously designated area 50.

As shown in FIG. 2(b), when the terminal 10 is outside the previously designated geographic area 50, the Area-id parameter may be used to implement the outside location service that keeps monitoring the location of the terminal 10 and the leaving location service that monitors whether or not the terminal 10 leaves the previously designated geographic area 50. In this case, the Area-id parameter includes a set of the IDs of the cells fully included in the previously designated geographic area 50. In case of the outside service, when the Area-id parameter is provided, the terminal 10 compares a cell-id of a cell in which the terminal 10 is currently located with a cell-id in the Area-id parameter, and if the both cell-ids are not consistent, the terminal 10 performs a position estimate (A-GPS) to monitor where the terminal 10 is located outside the previously designated geographic area 50. In case of the leaving service, the terminal 10 compares a cell-id of a cell in which the terminal 10 is currently located with a cell-id in the Area-id parameter, and if the both cell-ids are not consistent, the terminal 10 performs a position estimate to monitor whether or not the terminal 10 leaves the previously designated geographic area 50.

FIG. 3 illustrates the leaving location service among the area event triggered service as shown in FIG. 1.

As shown in FIG. 3, when the Area-id parameter is provided in the leaving location service likewise as above-described, a position estimate may be continuously performed unnecessarily as follows.

Such problem may arise when a repeated reporting function is used in the area event triggered location service. Namely, when a service requestor requests using of the repeated reporting function while requesting the leaving location service, a position estimate needs to be performed only on whether or not the terminal 10 has left the previously designated geographic area 50, but previous positioning is continuously performed as shown in FIG. 3.

In detail, it is assumed that the Area-id parameter is provided as shown in FIG. 3 and the terminal 10 moves along the path indicated by a dotted line.

While moving along the path indicated by the dotted line, the terminal 10 compares a cell-id in the provided Area-id parameter and a cell-id of a cell in which the terminal 10 is located. If the both cell-ids are not consistent, the terminal 10 performs a position estimate and reports the positioning result. The position estimate continues until when the terminal 10 completely leaves the previously designated geographic area 50. When the terminal 10 is determined to have been completely out of the previously designated geographic area 50, the terminal 10 reports the result.

Thus, although the terminal 10 gets completely out of the previously designated geographic area 50, the repeated reporting function is still used, so the terminal 10 keeps a position estimate and reporting the result.

Thereafter, even if the terminal 10 enters the previously designated geographic area 50, there is a possibility that the terminal 10 leaves the previously designated geographic area 50 until before it completely enters a cell having an id consistent to the cell-id of the provided Area-id parameter, so the terminal 10 keeps a position estimate.

However, because the terminal 10 does not enter the cell having the id consistent to the cell-id in the Area-id parameter along the path indicated by the dotted line, the terminal 10 keeps a position estimate.

As mentioned above, in case of using the repeated reporting function, although the terminal 10 has left the previously designated geographic area 50, the terminal keeps a position estimate until before it enters the cell having the id consistent to the cell-id in the provided Area-id parameter.

Thus, continuously performing the a position estimate wastes not only resource of the terminal 10 but also the network resources.

DISCLOSURE OF INVENTION

Technical Solution

Therefore, an object of the present invention is to address the above-noted and other problems.

That is, one object of the present invention is to prevent a position estimate from being continuously performed in a leaving location service.

Another object of the present invention is to provide an effective location service.

To achieve these and other advantages and in accordance with the purpose of the present invention, as embodied and broadly described herein, there is provided a method for newly defining an Area-id parameter and transferring the newly defined Area-id parameter to a terminal.

To achieve the above objects, there is also provided a location service method in a terminal including: receiving a message including a first parameter with respect to an inner area determined based on a particular geographic area and a second parameter with respect to an outer area determined based on a particular geographic area from a server; and checking whether or not the terminal leaves the particular geographic area through the parameters of the inner area and the outer area.

To achieve the above objects, there is also provided a location service method in a terminal including: receiving a message comprising a first parameter indicating one of an inner area and an outer area determined based on a particular geographic area and a second parameter indicating a list of cell IDs corresponding to the area indicated by the first parameter; and checking whether or not the terminal leaves the particular geographic area based on the first and second parameters.

The inner area may be fully included in the particular geographic area, and the outer area may completely surround the particular geographic area.

According to the embodiment of the present invention, the problem of the related art in which a position estimate is continuously performed in the leaving location service is solved.

According to the embodiment of the present invention, performing of a position estimate is reduced compared with the related art, so resources of an SET and network cannot be wasted.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 illustrates parameters configured for transferring an Outer Area-id parameter and an Inner Area-id parameter according to the first embodiment of the present invention; and FIG. 8 illustrates parameters configured for transferring one of the Outer Area-id parameter and the Inner Area-id parameter according to the second embodiment of the present invention.

MODE FOR THE INVENTION

Reference will now be made in detail to the preferred embodiments of the present invention, examples of which are illustrated in the accompanying drawings.

The accompanying drawings illustrate a SUPL enabled terminal (SET), and the SET may be one of a user equipment (UE) of a UMTS, a mobile station (MS) of a GSM, a laptop computer including an SET function, or a personal digital assistant (PDA). The SET may be various mobile terminals accessed via a wireless local area network (WLAN).

Figure 1:
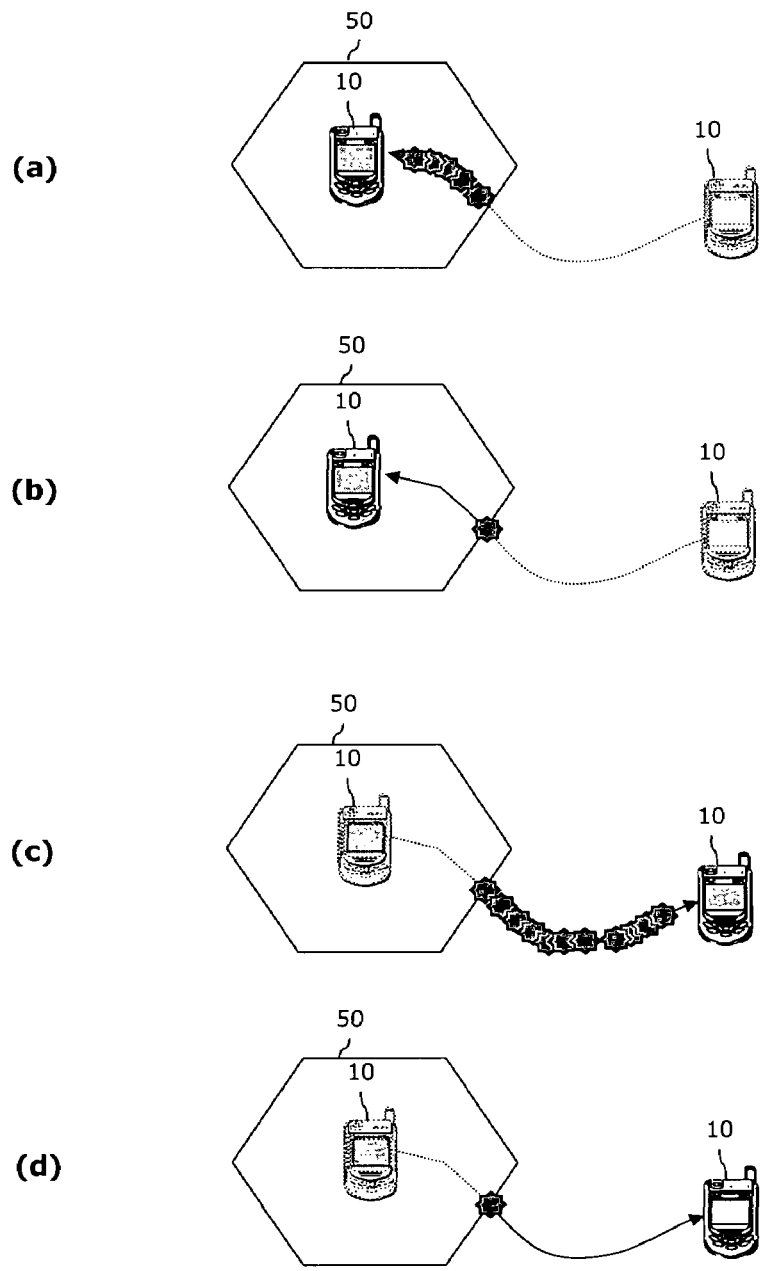
FIG. 1 illustrates a concept of an area event triggered service according to the related art.
Figure 2:
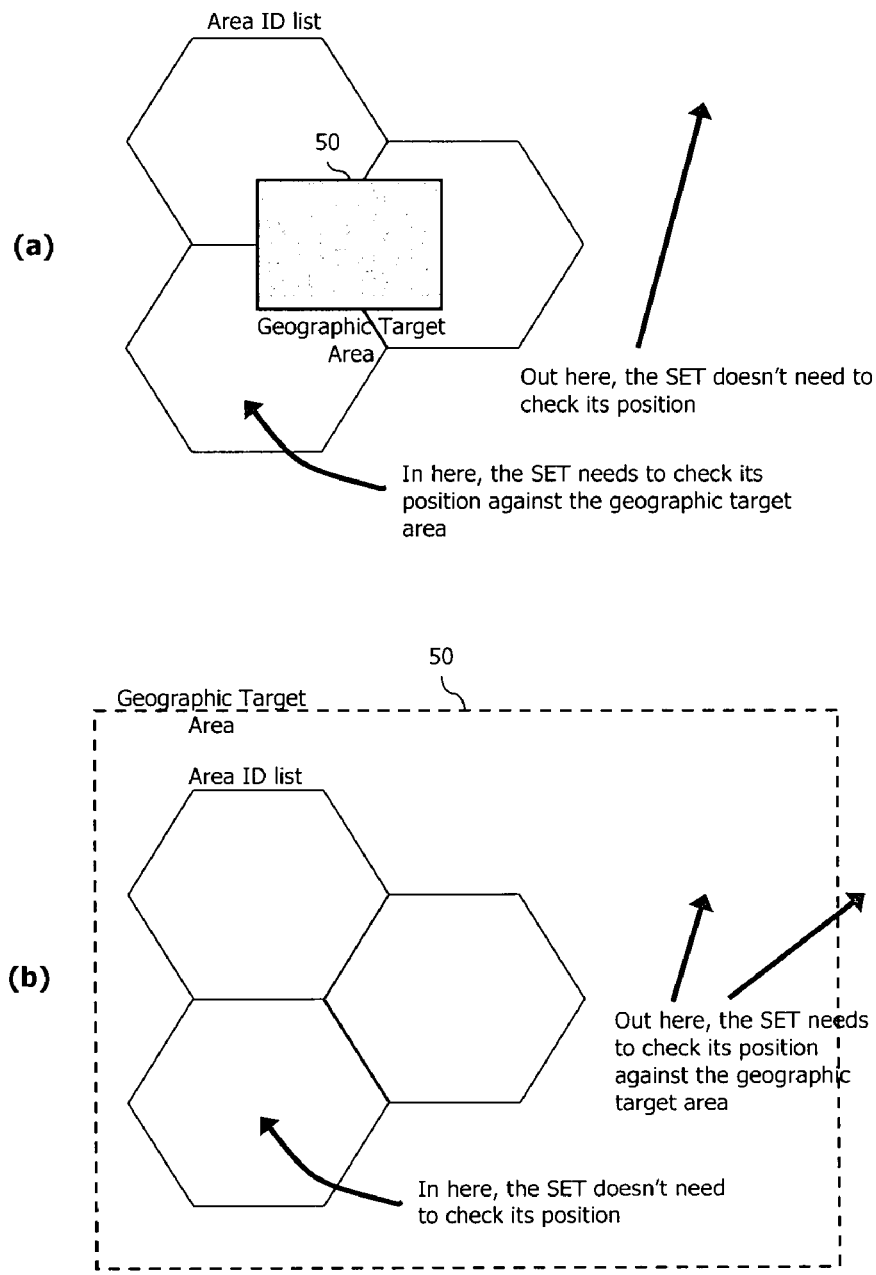
FIG. 2 illustrates an implementation of the area event triggered service of FIG. 1.
Figure 3:
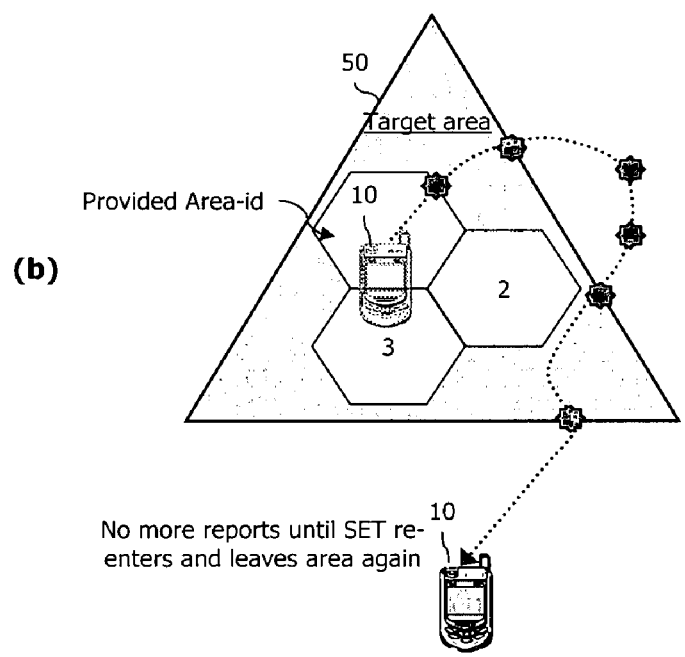
FIG. 3 illustrates a leaving location service, one of the area event triggered service of FIG. 1.
Figure 4:
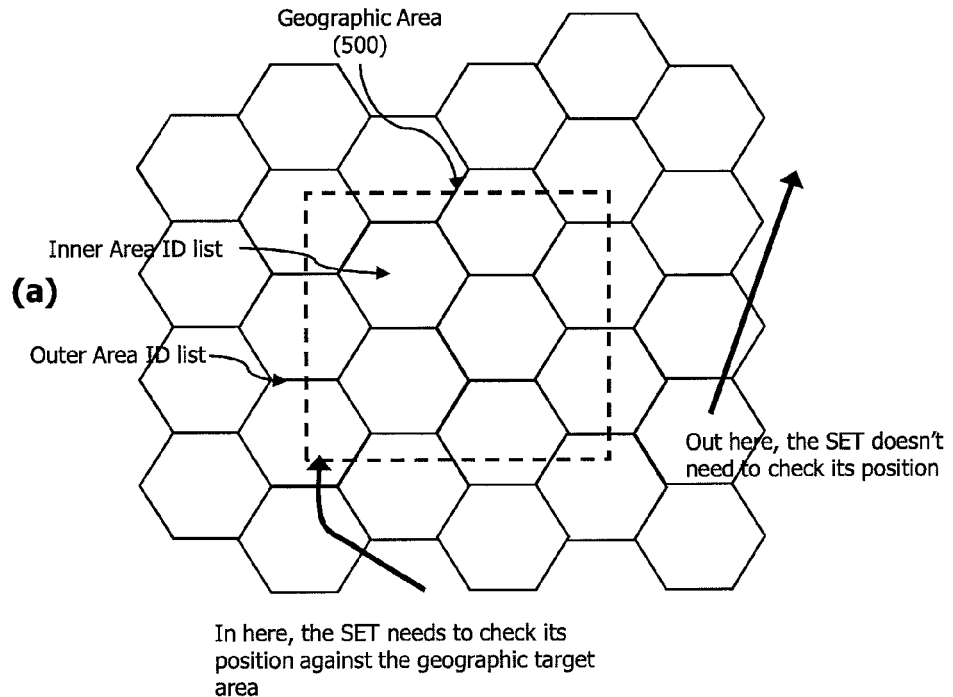
FIG. 4 illustrates a concept of a first embodiment of the present invention.
Figure 4:
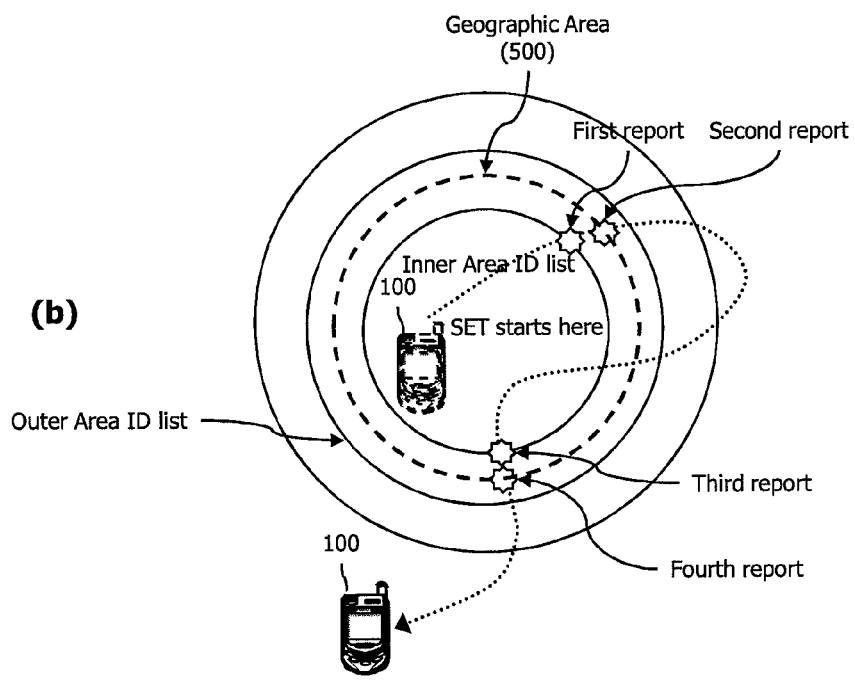

FIG. 4 illustrates a concept of a first embodiment of the present invention.

As shown in FIG. 4(*a*), for the leaving location service of the area event triggered service, an ID of an inner area, namely, an Inner Area-id parameter, and an ID of an outer area, namely, an Outer Area-id parameter, are provided.

The ID of the inner area, namely, the Inner Area-id parameter, includes a list of IDs of cells fully included in the previously designated particular geographic area 500. The ID of the outer area, namely, Outer Area-id parameter, includes a list of IDs of cells fully including the boundary of the previously designated particular geographic area 500 (namely, the cells located at the boundary of the previously designated particular geographic area 500).

With the Inner Area-id parameter and the Outer Area-id parameter, the target SET 100 may determine whether or not a position estimate should be performed based on the following references:

If an ID of a current cell to which the target SET 100 belongs is not consistent with a cell-id in the Inner Area-id parameter and a cell-id in the Inner Area-id parameter: The target SET 100 determines it is outside the previously designated particular geographic area 500 and does not perform a position estimate.

If an ID of a current cell to which the target SET 100 belongs is consistent with a cell-id in the Inner Area-id parameter: The target SET 100 determines that it is located within the previously designated particular geographic area 500 and does not perform a position estimate.

If an ID of a current cell to which the target SET 100 belongs is consistent with a cell-id in the Inner Area-id parameter: The target SET 100 determines that it is located near the previously designated particular geographic area 500 and there is a possibility that the target SET 100 leaves the previously designated particular geographic area 500, so the target SET 100 performs a position estimate.

The operation of the target SET 100 when the ID of the outer area and the ID of the inner area are provided will now be described with reference to FIG. 4*b*.

It is assumed that an ID of an outer area, namely, an Outer Area-id parameter, and an ID of an inner area, namely, an Inner Area-id parameter, are given as shown in FIG. 4(*b*) and the target SET 100 moves along the path indicated by a dotted line.

When the target SET 100 starts moving along the path indicated by the dotted line, it compares an ID of a cell to which the target SET 100 belongs with cell-ids in the Outer Area-id parameter and Inner Area-id parameter.

While on the move, if an ID of a cell to which the target SET 100 belongs is consistent with a cell-id in the Inner Area-id parameter, the target SET 100 determines that it is located within the previously designated particular geographic area 500 and does not perform a position estimate.

Thereafter, the target SET 100 keeps moving so the ID of the cell to which the target SET 100 belongs becomes not identical from a cell-id of the Inner Area-id parameter but identical to a cell-id in the Outer Area-id parameter, the target SET 100 determines that it is located near the boundary of the previously designated particular geographic area 500 and has a possibility that it leaves the previously designated particular geographic area 500, so the target SET 100 performs a position estimate.

If it is determined that the target SET 100, which keeps moving, leaves the previously designated particular geographic area 500, the target SET 100 reports a measured position.

Thereafter, if the target SET 100 continuously moves and when an ID of a cell to which the target SET 100 belongs is not identical with a cell-id of the Inner Area-id parameter and a cell-id of the Outer Area-id parameter, the target SET 100 determines that it is outside the previously designated particular geographic area 500 and does not perform a position estimate.

And then, the target SET 100 moves along the path indicated by the dotted line to enter the previously designated particular geographic area 500 again. In this case, although the target SET 100 enters the previously designated particular geographic area 500, if the ID of the cell to which the target SET 100 belongs is identical only to the cell-id in the Outer Area-id parameter but not identical to the cell-id in the Inner Area-id parameter, there is a possibility that the target SET 100 leaves the previously designated particular geographic area 500, so the target SET 100 performs a position estimate.

Thereafter, the target SET 100 keeps moving and an ID of a cell to which the target SET 100 belongs is identical to a cell-id in the Inner Area-id parameter, the target SET 100 does not perform a position estimate.

The target SET 100 moves around and an ID of a cell to which the target SET 100 belongs is not identical to a cell-id in the Inner Area-id parameter but identical to the Outer Area-id parameter, the target SET 100 determines that there is a possibility that it leaves again the previously designated particular geographic area 500, so it performs a position estimate.

When the target SET 100 continuously moves and it is determined that that the target SET 100 is leaving the previously designated particular geographic area 500 through a position estimate, the target SET 100 reports its measured location.

As described above, according to the first embodiment of the present invention, because the ID of the outer area, namely, the Outer Area-id parameter, and the ID of the inner area, namely, the Inner Area-id parameter, are provided, performing of the a position estimate can be reduced compared with the related art. Thus, a waste of resources of the target SET 100 and the network can be prevented compared with the related art.

Figure 5:
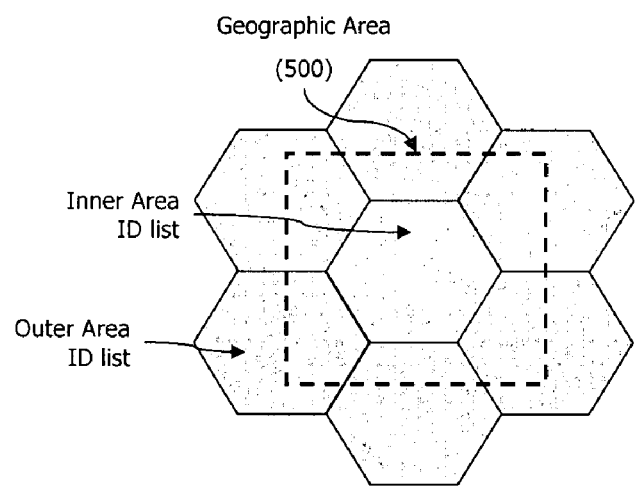
FIG. 5 illustrates a concept of a second embodiment of the present invention.

FIG. 5 illustrates a concept of a second embodiment of the present invention.

With reference to FIG. 5, according to the second embodiment of the present invention, for the leaving location service among the area event triggered service, only one of an ID of the inner area, namely, the Inner Area-id parameter, and an ID of the outer area, namely, the Outer Area-id parameter, is provided.

In detail, according to the second embodiment of the present invention, in the leaving location service, when repeated reporting is requested, an ID of an outer area, i.e., Outer Area-id parameter, is provided, and when single reporting is requested, an ID of an inner area, i.e., the Inner Area-id parameter, is provided.

The ID of the inner area, i.e., Inner Area-id parameter, includes a list of IDs of cells fully included in the previously designated particular geographic area 500. The ID of the outer area, i.e., Outer Area-id parameter, includes a list of IDs of cells completely including the boundary of the previously designated particular geographic area 500 (i.e., cells located in the boundary of the previously designated particular geographic area 500). The Outer Area-id parameter does not include IDs of cells of the Inner Area-id parameter.

The operation of the target SET 100 when only one of the Outer Area-id parameter and the Inner area-id parameter is provided will now be described.

First, when the repeated reporting is requested and only the Outer Area-id parameter is provided, if an ID of a cell to which the target SET 100 belongs is identical to a cell-id in the Outer Area-id parameter, the target SET 100 performs a position estimate. If the ID is not identical, the target SET 100 does not perform a position estimate.

When the single reporting is requested and only the inner Area-id parameter is provided, if an ID of a cell to which the target SET 100 belongs is not identical to a cell-id in the Inner Area-id parameter, the target SET 100 performs a position estimate.

A detailed operation of the target SET 100 is similar to that described above with reference to FIG. 4b, which can be easily understood by the person in the art from the above description, so its detailed description will be omitted.

As described above, according to the second embodiment of the present invention, the number of times of performing a position estimate or the performing time can be reduced compared with the related art. Thus, a waste of resources of the target SET 100 and the network can be prevented, compared with the related art.

Figure 6:
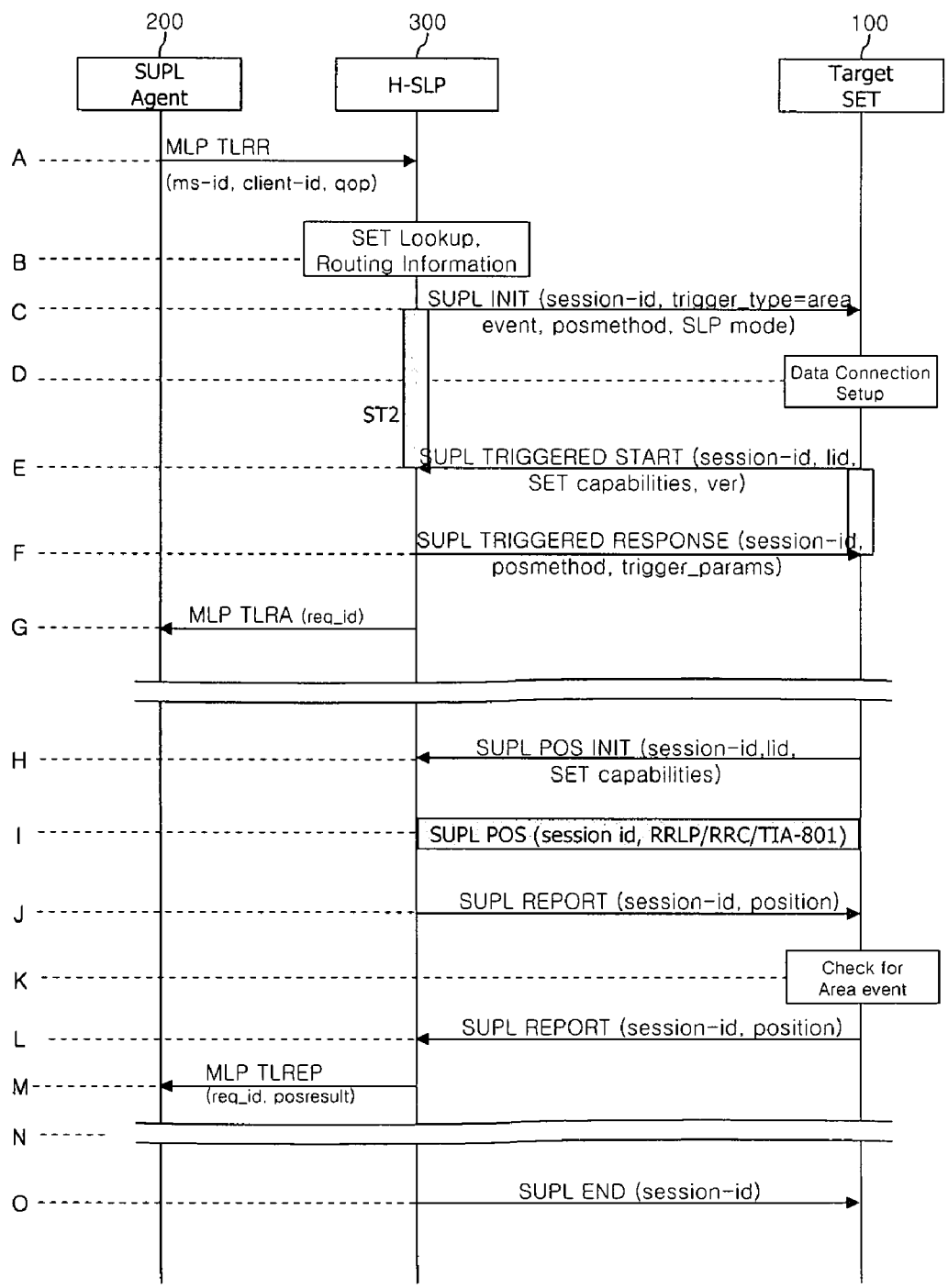
FIG. 6 illustrates a procedure for implementing the contents of the first and second embodiments of the present invention.

FIG. 6 illustrates a procedure for implementing the contents of the first and second embodiments of the present invention.

With reference to FIG. 6, there are shown a method for transferring both the Outer Area-id parameter and the Inner Area-id parameter according to the first embodiment of the present invention, or a method for transferring only one of the Outer Area-id parameter and the Inner Area-id parameter according to the second embodiment of the present invention, and a corresponding location measuring (positioning) method. This will now be described in detail.

A) In order to request the area triggered location service with respect to the target SET 100, a SUPL agent 200 transmits a location service request message, e.g., an MLP (Mobile Location Protocol) TLRR (Triggered Location Reporting Request) message, to an H-SLP (Home-SUPL Location Platform) 300. The H-SLP 300 refers to an SLP of a home network to which the target SET 200 has registered. The location service request message includes an ms-id, a client-id, and a qop. The ms-id is an ID of the target SET 100, the client-id is an ID of the SUPL agent 200, and qop, an acronym of Quality of Position, indicates accuracy (time delay, spatial precision) in location measurement.

B) When the H-SLP 300 receives the location service request message, it authenticates the SUPL agent 200 and checks whether the SUPL agent 200 has an authority with respect to the requested service via the client-id in the location service request message. Also, the H-SLP 300 checks whether to apply a subscriber privacy to the SUPL agent 200 based on the ms-id in the location service request message.

In addition, the H-SLP 300 checks whether the target SET 100 is currently in SUPL roaming, and also checks whether the target SET 100 supports the SUPL.

C) Subsequently, in order to start the area event triggered service, the H-SLP 300 transmits a session initiation message, i.e., an SUPL INIT message, to the target SET 100. The session initiation message includes a session-id parameter, a trigger type parameter indicating a type of a location service, a posmethod parameter indicating an intended (desired) positioning method, an SLP mode parameter indicating a proxy/non-proxy mode. Meanwhile, if it is required to notify about the target SET 200 according to the result of checking whether to apply the privacy, the H-SLP 300 may include a notification element in the session initiation message. In addition, before transmitting the session initiation message, the H-SLP 300 may calculate hash of the session initiation message to verify validity, and store the calculated hash.

D) The target SET 100 analyzes the received session initiation message, namely, the SUPL INIT message, and performs a required procedure for establishing a secure connection. In this case, if the SUPL agent 200 does not have authority, the target ST 100 may not perform any operation.

The target SET 100 checks whether the session initiation message includes a notification element. If the session initiation message includes a notification element, the target SET 100 checks a rule according to the notification element, and performs a corresponding operation. Also, the target SET 100 checks whether to use the proxy/non-proxy mode according to the SLP mode parameter included in the session initiation message. If the proxy mode is used, the target SET 100 establishes a stable connection to the H-SLP 300 by using an address of the H-SLP 300 provided from the home network.

E) In order to start the requested area event triggered service, the target SET 100 transmits a start message, e.g., a SUPL TRIGGERED START message, to the H-SLP 300. In this case, although a positioning method designated in the posmethod parameter included in the received session initiation message, i.e., the SUPL INIT message, is not supported by the target SET 100, the target SET 100 transmits the start message. The start message includes a session-id parameter, a location ID indicating a location, and a SET capabilities parameter indicating capability information of the target SET 100. In addition, the start message includes a hash of the received session initiation message. The SET capabilities parameter includes information about a supported location measurement method (e.g., SET-Assisted A-GPS or SET-Based A-GPS) and location measurement protocol (e.g., RRLP, RRC, TIA-801) related to the supported location measurement method.

F) When the start message, i.e., the SUPL TRIGGERED START message, is received, the H-SLP 300 selects a positioning method consistent with the SET capabilities parameter in the start message, and transmits a response message, e.g., SUPL TRIGGERED RESPONSE message, to the target SET 100. The response message includes a session-id parameter and a posmethod parameter indicating the selected positioning method. Also, the response includes a trigger-params parameter indicating an event trigger parameter.

The trigger-params parameter includes information about the previously designated particular geographic area 500 as described above. The trigger-params parameter may include both the Outer Area-id parameter and the Inner Area-id parameter according to the first embodiment of the present invention as illustrated in FIG. 7 or include only one of the Outer Area-id parameter and the Inner Area-id parameter according to the second embodiment of the present invention as illustrated in FIG. 8.

The H-SLP 300 and the target SET 100 release the stable connection.

G) Subsequently, in response to the location service request message from the SUPL agent 200, the H-SLP 300 transmits a response message, e.g., an MLP (Mobile Location Protocol) TLRA (Triggered Location Reporting Answer) message. The response message, i.e., the MLP TLRA message, includes a req-id parameter indicating a request ID.

H) Thereafter, the target SET 100 compares a cell-id in the Area-id parameter of the trigger-params parameter included in the received start message with an ID of the cell to which the target SET 100 belongs. Namely, the target SET 100 compares the ID of the cell to which the target SET 100 belongs with a cell-id in the Outer Area-id parameter and the cell-id in the Inner Area-id parameter. Or, the target SET 100 compares the ID of the cell to which the target SET 100 belongs with a cell-id in the Outer Area-id parameter or with the cell-id in the Inner Area-id parameter.

According to the comparison result, the target SET 100 transmits a position session initiation message, e.g., a SUPL POS INIT message, to the H-SLP 300 to start a session for performing a position estimate. The position session initial message, e.g., the SUPL POS INIT message, includes a session-id parameter, a location ID (lid) parameter indicating an ID of a location, and a SET capabilities parameter.

I) Upon receiving the position session initiation message, the H-SLP 300 performes a positioning estimate of the target SET 100. Or, the target SET 100 performes the positioning estimate.

J) If the position estimate is performed by the H-SLP 300, the H-SLP 300 transmits a report message, e.g., a SUPL REPORT message, to the target SET 100. The report message, i.e., the SUPL REPORT message, includes the result of the position estimate performed by the H-SLP 300.

K) If it is determined that the target SET 100 is leaving the previously designated particular geographic area 500 according to the result of the position estimate, an event occurs.

L) In order to report the event, the target SET 100 transmits a report message, e.g., a SUPL REPORT message, to the H-SLP 300. The report message includes a session-id parameter and a measured position.

M) Upon receiving the report message, the H-SLP 300 transmits an MLP (Mobile Location Protocol)-TLREP (Triggered Location Report) message including the measured position to the SUPL agent 200.

N) If the SUPL agent 200 has requested repeated reporting, the H-SLP 300 waits until another report message is received. Otherwise, the SUPL agent 200 goes to the next stage (O stage).

O) After transmitting a last report message to the SUPL agent 200, the H-SLP 300 transmits an end message, e.g., a SUPL END message, to the target SET 100 to end the session.

As discussed above, in the first and second embodiments of the present invention, the Area-id parameters, i.e., the Outer Area-id parameter and the Inner Area-id parameter, are included in the response message, e.g., the SUPL TRIGGERED RESPONSE message and transmitted from the H-SLP 300 to the target SET 100. An example of implementation of the Outer Area-id parameter and the Inner Area-id parameter will now be described with reference to FIGS. 7 and 8.

FIG. 7 illustrates the parameters configured for transferring the Outer Area-id parameter and the Inner Area-id parameter according to the first embodiment of the present invention.

As shown in FIG. 7, the trigger-params parameter included in the SUPL TRIGGERED RESPONSE message includes a Geographic Target Area List element and an Area Id Lists parameter.

The Geographic Target Area List element includes a Geographic Target parameter defining the configuration of a particular geographic area.

The Area Id Lists parameter includes one or more Area Id list parameters. The Area Id Lists parameter includes an Area Id Set parameter, an Outer Area Id Set parameter, and a geographic Area Mapping List parameter.

The Area Id Set parameter includes a list of cell IDs. The cells may be implemented based on a GSM, WCDMA, CDMA, HARP, UMB, LET, WLAN, or WiMAX.

The Outer Area Id Set parameter includes a list of IDs of outer area. When the Outer Area Id Set parameter is given, the Area Id Set parameter serves as the Inner Area-id parameter.

The Geographic Area Mapping List parameter includes a list of indexes of particular geographic areas.

Although not shown, the trigger-params parameter may include one or more of an Area Event Type parameter indicating a type of an area event triggered location services, namely, one of the Entering service, the Leaving service, the Inside service and the Outside service, a Location Estimate parameter indicating whether or not a position estimate needs to be performed, a Repeated Reporting parameter with respect to repeated reporting, a Start time parameter indicating a state of the location service, and a Stop time parameter indicating a type of the location service. The Repeated Reporting parameter includes one or more of a Minimum Interval Time parameter defining a minimum time of repeating and a Number of Report parameter indicating the number or repetitions.

FIG. 8 illustrates parameters configured for transferring one of the Outer Area-id parameter and the Inner Area-id parameter according to the second embodiment of the present invention.

As shown in FIG. 8, most elements are the same as those of FIG. 7, so the repeated description will be omitted and only a different element will be described.

The Area Id Set parameter indicates which type the Area Id Set parameter is. Namely, the Area Id Set Type indicates what's defined in the Area Id Set parameter is the Inner Area-id parameter or the Outer Area-id parameter.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A location service method in a terminal, the method comprising:

receiving, by the terminal, a message comprising a first parameter indicating one of an inner area and an outer area determined based on a particular geographic area, and a second parameter indicating a list of cell IDs corresponding to the area indicated by the first parameter; and checking whether or not the terminal leaves the particular geographic area based on the first and second parameters, wherein the first parameter indicates the outer area if whether or not the terminal leaves the particular geographic area should be repeatedly reported, and indicates the inner area if whether or not the terminal leaves the particular geographic area should be reported one time.

2. The method of claim 1, wherein the inner area is fully included in the particular geographic area, and the outer area is an area completely surrounding the boundary of the particular geographic area.

3. The method of claim 1, wherein the first parameter is an Area Id Set Type parameter, and the second parameter is an Area Id Set parameter.

4. A location service method in a terminal, the method comprising:

receiving, by the terminal, a message comprising a first parameter indicating one of an inner area and an outer area determined based on a particular geographic area, and a second parameter indicating a list of cell IDs corresponding to the area indicated by the first parameter; and checking whether or not the terminal leaves the particular geographic area based on the first and second parameters, wherein the first parameter indicates the outer area if whether or not the terminal leaves the particular geographic area should be repeatedly reported, and indicates the inner area if whether or not the terminal leaves the particular geographic area should be reported one time.

* * * * *